US008753561B2

(12) United States Patent
Lee et al.

(10) Patent No.: US 8,753,561 B2
(45) Date of Patent: Jun. 17, 2014

(54) METHODS FOR PROCESSING SUBSTRATES COMPRISING METALLIC NANOPARTICLES

(75) Inventors: Yann-Per Lee, Vernon Hills, IL (US); John-Bruce D. Green, Buffalo Grove, IL (US); Jeffrey Bloss, Vernon Hills, IL (US); Ozlem Yardimci, Vernon Hills, IL (US)

(73) Assignees: Baxter International Inc., Deerfield, IL (US); Baxter Healthcare SA, Glattpark (Opfikon) (CH)

( * ) Notice: Subject to any disclaimer, the term of this patent is extended or adjusted under 35 U.S.C. 154(b) by 684 days.

(21) Appl. No.: 12/143,319

(22) Filed: Jun. 20, 2008

(65) Prior Publication Data

US 2009/0314628 A1 Dec. 24, 2009

(51) Int. Cl.
*H05H 1/00* (2006.01)

(52) U.S. Cl.
USPC ........... 264/483; 424/405; 424/409; 424/617; 424/618; 424/630; 424/641; 424/646; 424/649; 424/650

(58) Field of Classification Search
CPC .......... B05D 3/141; B05D 3/148; B32B 5/16; H05H 1/00; A61K 33/24; A61K 33/38; A61K 33/30; A61K 33/34
USPC .......... 264/483; 424/405, 409, 617, 618, 630, 424/641, 646, 649, 650
See application file for complete search history.

(56) References Cited

U.S. PATENT DOCUMENTS

| | | | |
|---|---|---|---|
| 1,610,391 A | 12/1926 | Smith | |
| 1,783,334 A | 12/1930 | Keelan | |
| 3,856,805 A | 12/1974 | Margraf | |
| 3,932,627 A | 1/1976 | Margraf | |
| 4,045,400 A | 8/1977 | Korshak et al. | |
| 4,412,834 A | 11/1983 | Kulin et al. | |
| 4,417,890 A | 11/1983 | Dennehey et al. | |
| 4,440,207 A | 4/1984 | Genatempo et al. | |
| 4,457,749 A | 7/1984 | Bellotti et al. | |
| 4,485,064 A | 11/1984 | Laurin | |
| 4,581,028 A | 4/1986 | Fox, Jr. et al. | |
| 4,592,920 A | 6/1986 | Murtfeldt | |
| 4,603,152 A | 7/1986 | Laurin et al. | |
| 4,632,844 A * | 12/1986 | Yanagihara et al. | .......... 427/488 |
| 4,738,668 A | 4/1988 | Bellotti et al. | |
| 4,990,363 A | 2/1991 | Suhr et al. | |
| 5,019,096 A | 5/1991 | Fox, Jr. et al. | |
| 5,236,703 A | 8/1993 | Usala | |
| 5,242,532 A | 9/1993 | Cain | |
| 5,360,413 A | 11/1994 | Leason et al. | |
| 5,614,568 A | 3/1997 | Mawatari et al. | |
| 5,616,338 A | 4/1997 | Fox, Jr. et al. | |
| 5,630,804 A | 5/1997 | Imada et al. | |
| 5,643,190 A | 7/1997 | Utterberg | |
| 5,718,694 A | 2/1998 | Rupp | |
| 5,730,418 A | 3/1998 | Feith et al. | |
| 5,744,151 A | 4/1998 | Capelli | |
| 5,782,816 A | 7/1998 | Werschmidt et al. | |
| 5,863,548 A | 1/1999 | Elder | |
| 5,928,174 A | 7/1999 | Gibbins | |
| 5,948,385 A | 9/1999 | Chapman et al. | |
| 6,030,632 A | 2/2000 | Sawan et al. | |
| 6,039,302 A | 3/2000 | Cote, Sr. et al. | |
| 6,103,868 A | 8/2000 | Heath et al. | |
| 6,106,505 A | 8/2000 | Modak et al. | |
| 6,113,636 A | 9/2000 | Ogle | |
| 6,126,931 A | 10/2000 | Sawan et al. | |
| 6,150,430 A | 11/2000 | Walters et al. | |
| 6,180,584 B1 | 1/2001 | Sawan et al. | |
| 6,246,824 B1 | 6/2001 | Vandeberg et al. | |
| 6,264,936 B1 | 7/2001 | Sawan et al. | |
| 6,265,476 B1 | 7/2001 | Krongauz et al. | |
| 6,267,782 B1 | 7/2001 | Ogle et al. | |
| 6,280,802 B1 * | 8/2001 | Akedo et al. | ................... 427/561 |
| 6,323,256 B1 | 11/2001 | DelMain | |
| 6,329,488 B1 | 12/2001 | Terry et al. | |
| 6,355,858 B1 | 3/2002 | Gibbins | |
| 6,443,980 B1 | 9/2002 | Wang et al. | |
| 6,465,167 B2 | 10/2002 | Whitcomb et al. | |
| 6,472,451 B2 | 10/2002 | Ha et al. | |
| 6,480,250 B1 * | 11/2002 | Matsufuji et al. | ............. 349/113 |
| 6,497,901 B1 | 12/2002 | Royer | |
| 6,506,293 B1 | 1/2003 | Rumpf | |
| 6,506,814 B2 | 1/2003 | Krongauz et al. | |
| 6,530,951 B1 | 3/2003 | Bates et al. | |
| 6,548,121 B1 | 4/2003 | Bauer et al. | |
| 6,565,913 B2 | 5/2003 | Arps et al. | |
| 6,579,539 B2 | 6/2003 | Lawson et al. | |

(Continued)

FOREIGN PATENT DOCUMENTS

CN 18734048 12/2006
EP 0190504 8/1986

(Continued)

OTHER PUBLICATIONS

English Translation of JP 86-082504 Abstract.*

(Continued)

*Primary Examiner* — Christina Johnson
*Assistant Examiner* — Elizabeth Royston
(74) *Attorney, Agent, or Firm* — Marshall, Gerstein & Borun LLP

(57) ABSTRACT

Methods for processing substrate surfaces comprising metallic nanoparticles are disclosed. The methods involve providing a substrate surface comprising metallic nanoparticles, and exposing the substrate surface to a plasma.

17 Claims, No Drawings

(56) References Cited

U.S. PATENT DOCUMENTS

| | | | |
|---|---|---|---|
| 6,592,814 B2 | 7/2003 | Wilcox et al. | |
| 6,596,401 B1 | 7/2003 | Terry et al. | |
| 6,605,751 B1 | 8/2003 | Gibbins et al. | |
| 6,645,444 B2 | 11/2003 | Goldstein | |
| 6,669,681 B2 | 12/2003 | Jepson et al. | |
| 6,682,509 B2 | 1/2004 | Lopez | |
| 6,689,192 B1 | 2/2004 | Phillips et al. | |
| 6,706,201 B1 | 3/2004 | Meyer et al. | |
| 6,716,891 B1 | 4/2004 | Meisenburg et al. | |
| 6,716,895 B1 | 4/2004 | Terry | |
| 6,780,332 B2 | 8/2004 | Shiau et al. | |
| 6,783,690 B2 | 8/2004 | Kologe et al. | |
| 6,800,278 B1 | 10/2004 | Perrault et al. | |
| 6,849,214 B2 | 2/2005 | Patil | |
| 6,852,771 B2 | 2/2005 | Balch et al. | |
| 6,878,757 B2 | 4/2005 | Roby | |
| 6,897,349 B2 | 5/2005 | Gibbins et al. | |
| 6,908,681 B2 | 6/2005 | Terry et al. | |
| 6,921,390 B2 | 7/2005 | Bucay-Couto et al. | |
| 6,949,598 B2 | 9/2005 | Terry | |
| 6,984,392 B2 | 1/2006 | Bechert et al. | |
| 7,179,849 B2 | 2/2007 | Terry | |
| 7,232,777 B1 | 6/2007 | Van Hyning | |
| 7,288,264 B1 | 10/2007 | Sawan et al. | |
| 7,345,980 B2 * | 3/2008 | Richard | 369/101 |
| 7,378,156 B2 | 5/2008 | Terry | |
| 2001/0023250 A1 | 9/2001 | Spada et al. | |
| 2002/0035032 A1 | 3/2002 | Koper et al. | |
| 2003/0031872 A1 | 2/2003 | Arps et al. | |
| 2003/0129322 A1 | 7/2003 | Kunz et al. | |
| 2003/0141477 A1 | 7/2003 | Miller | |
| 2003/0157147 A1 | 8/2003 | Hoge et al. | |
| 2003/0157176 A1 | 8/2003 | Nakamura et al. | |
| 2003/0165633 A1 | 9/2003 | Ryu et al. | |
| 2003/0198821 A1 | 10/2003 | Terry et al. | |
| 2003/0208165 A1 | 11/2003 | Christensen et al. | |
| 2004/0052831 A1 | 3/2004 | Modak et al. | |
| 2004/0069654 A1* | 4/2004 | McLaughlin et al. | 205/704 |
| 2004/0106341 A1 | 6/2004 | Vogt et al. | |
| 2004/0191329 A1 | 9/2004 | Burrell et al. | |
| 2004/0229034 A1 | 11/2004 | Djokic | |
| 2005/0003019 A1 | 1/2005 | Petersen | |
| 2005/0008676 A1* | 1/2005 | Qiu et al. | 424/429 |
| 2005/0013842 A1 | 1/2005 | Qiu et al. | |
| 2005/0019533 A1 | 1/2005 | Mossbrook et al. | |
| 2005/0064176 A1* | 3/2005 | Terry | 428/323 |
| 2005/0126338 A1 | 6/2005 | Yadav | |
| 2005/0147919 A1 | 7/2005 | Kunz et al. | |
| 2005/0147979 A1 | 7/2005 | Koo et al. | |
| 2005/0226931 A1 | 10/2005 | Gibbins et al. | |
| 2006/0068024 A1 | 3/2006 | Schroeder et al. | |
| 2006/0085036 A1 | 4/2006 | Viola | |
| 2006/0090596 A1 | 5/2006 | Goia et al. | |
| 2006/0140994 A1 | 6/2006 | Bagwell et al. | |
| 2006/0141015 A1 | 6/2006 | Tessier et al. | |
| 2006/0167180 A1 | 7/2006 | Plaut et al. | |
| 2006/0216327 A1 | 9/2006 | Madsen et al. | |
| 2006/0222971 A1* | 10/2006 | Seo et al. | 430/7 |
| 2006/0257681 A1 | 11/2006 | Wolf et al. | |
| 2006/0269485 A1 | 11/2006 | Friedman et al. | |
| 2007/0003603 A1* | 1/2007 | Karandikar et al. | 424/443 |
| 2007/0048356 A1 | 3/2007 | Schorr et al. | |
| 2007/0050007 A1 | 3/2007 | Kondyurin et al. | |
| 2007/0085036 A1 | 4/2007 | Santhouse | |
| 2007/0098806 A1 | 5/2007 | Ismail et al. | |
| 2007/0154506 A1 | 7/2007 | Patton et al. | |
| 2007/0154634 A1* | 7/2007 | Renn | 427/180 |
| 2007/0207335 A1 | 9/2007 | Karandikar et al. | |
| 2007/0212381 A1 | 9/2007 | DiFiore et al. | |
| 2007/0254044 A1 | 11/2007 | Karandikar et al. | |
| 2008/0021381 A1 | 1/2008 | Lurvey et al. | |
| 2008/0021392 A1 | 1/2008 | Lurvey et al. | |
| 2008/0027410 A1 | 1/2008 | Harding et al. | |
| 2008/0063693 A1 | 3/2008 | Cook et al. | |
| 2008/0181931 A1 | 7/2008 | Qiu et al. | |
| 2009/0317435 A1 | 12/2009 | Vandesteeg et al. | |
| 2009/0324666 A1 | 12/2009 | Krongauz et al. | |
| 2009/0324738 A1 | 12/2009 | Krongauz | |

FOREIGN PATENT DOCUMENTS

| | | |
|---|---|---|
| EP | 0328421 | 8/1989 |
| GB | 2000788 | 1/1979 |
| JP | 86-082504 * | 7/1981 |
| JP | 8133919 A | 5/1996 |
| JP | 2004-238359 * | 8/2004 |
| JP | 2007182605 | 7/2007 |
| WO | WO-94/22522 | 10/1994 |
| WO | WO-01/43788 | 6/2001 |
| WO | WO-02/083156 | 10/2002 |
| WO | WO-2006/026026 | 3/2006 |
| WO | WO-2006/056482 A1 | 6/2006 |
| WO | WO-2006/067061 | 6/2006 |
| WO | WO-2006/074117 A2 | 7/2006 |
| WO | WO-2006/099906 | 9/2006 |
| WO | WO-2007/000590 | 1/2007 |
| WO | WO-2007/028607 | 3/2007 |
| WO | WO-2007/070649 | 6/2007 |
| WO | WO-2007/095058 A2 | 8/2007 |
| WO | WO-2007/104107 | 9/2007 |
| WO | WO-2008/031601 | 3/2008 |
| WO | WO-2008/036377 | 3/2008 |
| WO | WO-2008/068154 | 6/2008 |
| WO | WO-2008/145750 | 12/2008 |
| WO | WO-2009/154905 A1 | 12/2009 |

OTHER PUBLICATIONS

English Translation of JP 86-082504, p. 3, col. 9, lines 4-7 and 13-17.*

JP 2004-238359 English machine translation, retrieved Jun. 16, 2013.*

Bacterin International Inc., *Bacterin: The Smart Coating*, Slide Presentation (8 pages).

Bailey et al., "The electrochemistry and kinetics of the silver-triiodide reaction," *Electrochimica Acta*, 22:35-40 (1977).

Broome et al. "Complex formation with high molecular weight amines. I." *J. Am. Chem. Soc.*, 68:67-69 (1946).

Campbell et al. "The chemical iodination of silver," *Australian J. Chem.* 39:827-837 (1986).

Clement et al., "Antibacterial silver," *Metal Based Drugs*, 1:467-482 (1994).

Dai et al., "2D and 3D silver(I) ethylenediamine coordination polymers with Ag-Ag argentophilic interaction," *Z. Naturforsch.*, 62b: 1112-1116 (2007).

Dong et al., Silver carboxylate nanostructure nucleation and growth on AgBr crystals, *Nanotechnology*, 16:S592-S600 (2005).

Duff et al., "The microstructure of colloidal silver: evidence for a polytetrahedral growth sequence," *J. Chem. Soc., Chem. Comm.*, 16:1264-1266 (1987).

Hozumi et al., "Spatially defined silver mirror reaction on micropatterned aldehyde-terminated self-assembled monolayer," *Appl. Surface Science*, 252:6111-6114 (2006).

Kang et al., "Surface chemistry of ethylenediamine ($NH_2$-$CH_2CH_2NH_2$) on Pt(111)," *Surface Science*, 470: L13-L19 (2000).

Lansdown, "Silver in health care: antimicrobial effects and safety in use," In: Hipler et al. (eds.), Biofunctional Textiles and the Skin. *Curr. Probl. Dermatol.* Basel: Karger, 33:17-34 (2006).

Magyar et al., "The silver(I) complexes of ethylenediamine in solution," *Acta Chem. Scand. A*, 32:943-955 (1978).

Mills et al., "Formation of $\mu 2, \eta^{2-Diaminoethylene}$ ($^H_2$NCCNH$_2$) from Cyanogen ($C_2N_2$) and Hydrogen on Pt(111): Characterization of a Diiminium Surface Species," *J. Am. Chem. Soc.*, 118:6524-6525 (1996).

Newman et al., "The infrared spectra and structures of some silver-ethylenediamine complexes," *J. Chem. Soc.*, 3447-3450 (1962).

Nielsen et al., "The basis for colored silver-protein complex formation in stained polyacrylamide gels," *Anal. Biochem.*, 141:131-315 (1984).

(56) References Cited

OTHER PUBLICATIONS

Olson et al., "The simple yet elusive crystal structure of silver acetate and the role of the Ag-Ag bond in the formation of silver nanoparticles during the thermally induced reduction of silver carboxylates," *Chem. Mater.*, 18:1667-1674 (2006).
Patra et al., "The synthesis and characterization of a series of bis-bidentate Schiff base ligands and their coordination complexes with silver(I), copper(I) and zinc(II) d10 metal ions," *New J. Chem.*, 27:1124-1131 (2003).
Qu et al., "Novel silver nanostructures from silver mirror reaction on reactive substrates," *J. Phys. Chem. B*, 109:13985-13990 (2005).
Qu et al., "Synthesis and crystal structure of copper II and silver I complex with 1,4-diazabicyclo[2.2.2]octane[Cu(CBC)$_2$(Dabco)(H$_2$O)] $n$ (1) and [Ag2(HBC)$_2$(Dabco)] $_n$ (2)," *J. Chem. Crystallogr.*, 37: 579-582 (2007).
Rabii et al., "Measurement and control of thin film uniformity in hollow glass waveguides," *Opt. Eng.*, 38:2009-2015 (1999).
Richards et al., "Chapter I: Synthetic approaches to metallic nanomaterials," In: Kumar et al. (eds.), *Nanofabrication Towards Biomedical Applications: Techniques, Tools, Applications, and Impact*, 1st edition, Wiley-VCH, pp. 3-32 (2005).
Ross et al., *Colloidal Systems and Interfaces*, J. Wile & Sons (1988).
Satoshi et al., "Bleach-fixer using a new biodegradable chelating agent," *Konika Technical Report*, 16:13-18 (2003).
Southeast Missouri State University, *CH186 Lecture Presentation: Transition Metal/Coordination Chemistry*. Retrieved from the Internet, Nov. 3, 2008: <URL: http://chemistry.semo.edu/crawford/ch186/lectures/ch20/>.
Starovoytov et al., "Dissolution behavior of silver in ammoniacal solutions using bromine, iodine and hydrogen-peroxide as oxidants," *Hydrometallurgy*, 86:114-119 (2007).
Tammann et al., "Uber anlauffarben von metallen," *Allg. Chem.*, 111:78-89 (1920). [German Only].
University of Waterloo, *Coordination Chemistry*. Retrieved from the Internet, Nov. 10, 2008: <URL: http://www.science.uwaterloo.ca/~cchieh/cact/cact.html>.
University of Waterloo, *Cyberspace Chemistry (CaCt)*. Retrieved from the Internet, Nov. 3, 2008: <URL: http://www.science.uwaterloo.ca/~cchieh/cact/cact.html>.
Yilmaz et al., "Silver(I) saccharinato complexes with ethylenediamine and N,N-Dimethylethylenediamine—[Ag$_2$(sac)$_2$(en)(H$_2$0] and [Ag$_2$ (sac) $_2$ (dmen)$_2$]," *Z. Anorg. Allg. Chem.*, 631:1961-1965 (2005).
Zhai et al., "Silver colloids and interfacial colloids-adsorption of alizarin yellow 2G and its effect on colloidal nulcleation," *Langmuir*, 13:420-425 (1997).
Copending U.S. Appl. No. 12/400,439 (Carter et al.), filed Mar. 9, 2009.
Elliott et al., Intravascular catheter-related sepsis—novel methods of prevention, *Intensive Care Med.*, 26:S45-50 (2000).
Humar et al., Prospective randomized trial of 10% povidone-iodine versus 0.5% tincture of chlorhexidine as cutaneous antisepsis for prevention of central venous catheter infection, *Clinical Infectious Diseases*, 31:1001-7 (2000).
O'Grady et al., *Guidelines for the Prevention of Intravascular Catheter-Related Infections*, MMWR Recommendations and Reports, 51(RR10):1-26 (Aug. 9, 2002).
Office action (nonfinal) from U.S. Appl. No. 12/164,414, dated Apr. 30, 2010.
Office action (nonfinal) from U.S. Appl. No. 12/143,304, dated May 26, 2010.
International Search Report and Written Opinion for corresponding International Application No. PCT/US09/43965 dated Aug. 5, 2009 (6 pp.).
Belfield et al., *Photoinitiated Polymerization*, ACS Symposium Series 847, American Cancer Society, Washington DC (2003).
Brown (ed.), *Chemistry: The Central Science*, 6th edition, Prentice Hall (2002).
Dean, Table 8.6, In: *Lange's Handbook of Chemistry*, 15th ed., McGraw Hill (1998).
Fan et al., "Chemical, electrochemical, gravimetric, and microscopic studies on antimicrobial silver films", *J. Phys. Chem. B*, 106:279-87 (2002).
International Search Report and Written Opinion for corresponding International Application No. PCT/US09/043965 (Aug. 5, 2009).
Jacobs et al., "Thermodynamics of complex formation reactions in non-aqueous solvents : Part 2. Reaction of silver(I) with N,N,N',N'-tetramethylene diamine in acetone, methanol and ethanol", *Thermochimica Acta*, 127:399-402 (1988).
Kampf et al., "Microbicidal activity of a new silver-containing polymer, SPI-ARGENT II", *Antimicrob Agents Chemother.*, 42:2440-2 (1998).
Kapoor, "Preparation, characterization, and surface modification of silver particles," *Langmuir*, 14:1021-5 (1998).
Kashiwagi et al., "Facile size-regulated synthesis of silver nanoparticles by controlled thermolysis of silver alkylcarboxylates in the presence of alkylamines with different chain lengths", *J. Colloid Interface Sci.*, 300:169-75 (2006).
Klang, *Radiation Curable Hyperbranched Polyester Acrylates*, Sartomer Company, Exton, Pennsylvania (Mar. 2008) (6 pp.).
Klasen, "A historical review of the use of silver in the treatment of burns. II. Renewed interest for silver", *Burns*, 26:131-8 (2000).
Krongauz et al., *Processes in Photoreactive Polymers*, New York, NY: Chappman & Hall (1995).
Russell et al., "Antimicrobial activity and action of silver", *Prog. Med. Chem.*, 351-70 (1994).
Sartomer Co. Product Bulletin, *Hydrophilic vs. Hydrophobic Monomers* (Exton, Penn.) Dec. 2004 (8 pp.).
*Solubility Product Constants*, from University of Split Faculty of Chemistry and Technology website <URL:http://www.ktf-split.hr> downloaded Jun. 16, 2008 (6 pp.).
Van Poucke, "The thermodynamics of ethylene-diamine complexes of silver," *Talanta*, 23:161-2 (1976).
Yamamoto et al., "Size-controlled synthesis of monodispersed silver nanoparticles capped by long-chain alkyl carboxylates from silver carboxylate and tertiary amine," *Langmuir*, 22:8581-6 (2006).
Zwanenburg, *How to Formulate UV-Curing Coatings*, (Verneuil en Hallatte, France) (2008) (20 pp.).
Kim et al., Antimicrobial effects of silver nanoparticles, *Nanomed.: Nanotechnol. Biol. Med.*, 3:95-101 (2007).
Lok et al., Silver nanoparticles: partial oxidation and antibacterial activities, J. Biol. Inorg. Chem., 12:527-34 (2007).
Final office action from U.S. Appl. No. 12/164,414, dated Feb. 25, 2011.
Final office action from U.S. Appl. No. 12/143,304, dated Mar. 8, 2011.
Schwartz, Encyclopedia of Materials, Parts, and Finishes, Second Edition, p. 857, CRC Press (2002).
Tang et al., Studies on measurement of chloride ion concentration in concrete structures with long-period grating sensors, In: Tomizuka et al. (eds.), Smart Structures and Materials 2006, Proc. of SPIE, vol. 6174, 11 pages. (2006).
Partial English Translation of Japanese Patent No. JP8133919A (6 pages).
Partial English Translation of Japanese Patent No. JP56-82504A (2 pages).
Nonfinal office action from U.S. Appl. No. 12/145,548, dated May 13, 2011.
Nonfinal office action, U.S. Appl. No. 12/400,439, dated Dec. 23, 2011.
Nonfinal office action, U.S. Appl. No. 12/145,548, dated Dec. 5, 2011.
Schutze et al., The past, the present, and the future of high temperature corrosion research—an EFC view, European Federation of Corrosion (2008).
Partial English Translation of Japanese Patent No. JP8133919A (published May 28, 2006)—remainder of specification and cover page.

\* cited by examiner

METHODS FOR PROCESSING SUBSTRATES COMPRISING METALLIC NANOPARTICLES

BACKGROUND

1. Field of the Disclosure

The disclosure relates generally to methods for processing substrates comprising metallic nanoparticles. More particularly, the disclosure is directed to methods of processing substrates, such as medical devices, comprising metallic nanoparticles and having antimicrobial activity.

2. Brief Description of Related Technology

Even brief exposure to surfaces contaminated with microbes can introduce bacterial, viral, fungal, or other undesirable infections to humans and other animals. Of particular concern is preventing or reducing microbial infection associated with the use of invasive medical devices such as catheters, intravenous fluid administration systems, and similar medical devices which require prolonged patient contact and thus present significant infection risks. Contamination may result from the patients' own flora or from one or more healthcare workers' hands during insertion and/or manipulation of the device, or from both the patient and the healthcare worker. Medical devices coated with antimicrobial materials can reduce the transfer of such microbes to patients, thereby improving the safety and efficacy of these devices. Such antimicrobial coatings often include silver metal or silver salts, or other metals with demonstrable antimicrobial activity such as copper, gold, zinc, cerium, platinum, palladium, or tin.

Silver and salts thereof are commonly used in antimicrobial coatings because of their demonstrated broad spectrum antimicrobial activity against various bacteria, viruses, yeast, fungi, and protozoa. It is theorized that the observed antimicrobial activity is primarily due to the ability of silver ions to tightly bind nucleophilic functional groups containing sulfur, oxygen or nitrogen. Many nucleophilic functional groups such as thiols, carboxylates, phosphates, alcohols, amines, imidazoles, and indoles are prevalent in biomolecules. Upon binding of ionized silver to these various nucleophilic functional groups, it is believed that widespread disruption and inactivation of microbial biomolecules (and thus antimicrobial activity) occurs.

Silver and salts thereof have therefore been used as antimicrobial agents in a wide variety of applications; for example, they have been incorporated in the absorbent materials of wound care products such as dressings, gels, and bandages, and also in compositions for providing antimicrobial coatings on medical devices. One disadvantage of some metallic silver-containing antimicrobial coatings, however, is their color/opaqueness, which prevents a healthcare provider from being able to see through the medical device substrate. Silver nanoparticle coatings, for example, can be brown in color. Thus, when silver nanoparticle coatings are applied to transparent surfaces, the coated surfaces typically have a brown color and significantly diminished transparency.

SUMMARY

The present disclosure is directed to methods for processing substrates comprising metallic nanoparticles. The methods include providing a substrate surface comprising metallic nanoparticles, and exposing the substrate surface to a plasma. In one aspect, the substrates can have or carry a coating comprising the metallic nanoparticles.

The substrate surfaces can comprise plastic, glass, metal, ceramics, elastomers, or mixtures or laminates thereof. The substrate surfaces can comprise surfaces of medical devices or medical device components. Preferred examples of substrate surfaces include polycarbonate medical devices. The substrate surface also can comprise surfaces of medical fluid containers or medical fluid flow systems. Preferred examples of medical fluid flow systems include I.V. sets and components thereof, such as, for example, luer access devices.

The metallic nanoparticles can comprise various metals or mixtures of metals. Preferred metals include silver, copper, gold, zinc, cerium, platinum, palladium, and tin.

The plasma can be generated from various inert gases and reactive gases, as well as mixtures of inert gases, mixtures of reactive gases, and/or mixtures of inert gases and reactive gases.

DETAILED DESCRIPTION

The present disclosure is directed to methods of processing substrates comprising metallic nanoparticles. The methods according to the invention involve providing a substrate surface comprising metallic nanoparticles and exposing the substrate surface to a plasma. In one aspect, the substrates can have or carry a coating comprising the metallic nanoparticles.

The substrate surfaces carrying metallic nanoparticle coatings can be produced by a wide variety of known methods for coating surfaces with metallic nanoparticles. Known techniques for producing silver nanoparticle coatings include, for example, silver mirroring, chemical vapor deposition, physical vapor deposition (e.g., sputtering), e-beam deposition, electroplating, and solution coating. Suitable coating compositions for providing a substrate surface carrying a metallic nanoparticle coating and methods for producing such coated substrates are disclosed, for example, in U.S. Pat. Nos. 6,126,931, 6,180,584, 6,264,936, 6,716,895, 7,179,849, 7,232,777, 7,288,264, and U.S. Patent Application Publication Nos. 2007/0003603, 2007/0207335, the disclosures of which are hereby incorporated by reference in their entireties.

As previously discussed, many metallic nanoparticle coatings are opaque, or exhibit a colored appearance. Silver nanoparticle coatings, for example, can be brown in color, and thus substrates carrying such coatings can have a brown color and exhibit poor transparency. Exposing substrate surfaces carrying metal nanoparticle coatings to a plasma according to the methods disclosed herein can advantageously increase the transparency of the metal nanoparticle coating, thereby providing, for example, an efficient method for obtaining medical devices comprising a more transparent antimicrobial coating. Accordingly, the disclosed methods advantageously increase the transparency of such coatings and hence the transparency of substrate surfaces carrying such coatings.

Furthermore, it is envisioned that the disclosed methods can increase the polydispersity of the metallic nanoparticles (in the coatings) and thereby provide coatings capable of broader release profiles and thus of demonstrating sustained antimicrobial activity over time (at least relative to coatings which have not been treated in accordance with the inventive methods). By changing the polydispersity of the metallic nanoparticles, the disclosed methods are also believed to provide coatings capable of enhanced efficacy because such coatings include smaller metallic nanoparticles after exposure to a plasma treatment in accordance with the disclosure (at least relative to coatings which have not been treated in accordance with the inventive methods) and thus can demonstrate a burst of antimicrobial activity sooner (at least relative to coatings which have not been treated in accordance with the inventive methods) because smaller particles are expected to dissolve more quickly relative to the larger particles contained in the original coating.

The substrate surfaces of the present disclosure can comprise various materials including, for example, glasses, metals, plastics, ceramics, and elastomers, as well as mixtures and/or laminates thereof. Suitable examples of plastics include, but are not limited to, acrylonitrile butadiene styrenes, polyacrylonitriles, polyamides, polycarbonates, polyesters, polyetheretherketones, polyetherimides, polyethylenes such as high density polyethylenes and low density polyethylenes, polyethylene terephthalates, polylactic acids, polymethyl methyacrylates, polypropylenes, polystyrenes, polyurethanes, poly(vinyl chlorides), polyvinylidene chlorides, polyethers, polysulfones, silicones, and blends and copolymers thereof. Suitable elastomers include, but are not limited to, natural rubbers, and synthetic rubbers such as styrene butadiene rubbers, ethylene propylene diene monomer rubbers (EPDM), polychloroprene rubbers (CR), acrylonitrile butadiene rubbers (NBR), chlorosuphonated polyethylene rubbers (CSM), polyisoprene rubbers, isobutylene-isoprene copolymeric rubbers, chlorinated isobutylene-isoprene copolymeric rubbers, brominated isobutylene-isoprene copolymeric rubbers, and blends and copolymers thereof.

In one preferred embodiment of the present disclosure, the metal nanoparticle coating is present on (or carried by) a surface of a medical device or medical device component. Medical devices and medical device components which can benefit from the methods according to the disclosure, include, but are not limited to, instruments, apparatuses, implements, machines, contrivances, implants, and components and accessories thereof, intended for use in the diagnosis, cure, mitigation, treatment, or prevention of disease or other condition in humans or other animals, or intended to affect the structure or any function of the body of humans or other animals. Such medical devices are described, for example, in the official National Formulary, the United States Pharmacopoeia, and any supplements thereto. Representative medical devices include, but are not limited to: catheters, such as venous catheters, urinary catheters, Foley catheters, and pain management catheters; dialysis sets; dialysis connectors; stents; abdominal plugs; feeding tubes; indwelling devices; cotton gauzes; wound dressings; contact lenses; lens cases; bandages; sutures; hernia meshes; mesh-based wound coverings; surgical tools; medical monitoring equipment including, but not limited to the touch screen displays often used in conjunction with such equipment; medical pumps; pump housings; gaskets such as silicone O-rings; needles; syringes; surgical sutures; filtration devices; drug reconstitution devices; implants; metal screws; and metal plates. Additional exemplary medical devices include, but are not limited to, medical fluid containers, medical fluid flow systems, infusion pumps, and medical devices such as stethoscopes which regularly come into contact with a patient. One example of a medical fluid flow system is an intravenous fluid administration set, also known as an I.V. set, used for the intravenous administration of fluids to a patient. A typical I.V. set uses plastic tubing to connect a phlebotomized subject to one or more medical fluid sources, such as intravenous solutions or medicament containers. I.V. sets optionally include one or more access devices providing access to the fluid flow path to allow fluid to be added to or withdrawn from the IV tubing. Access devices advantageously eliminate the need to repeatedly phlebotomize the subject and allow for immediate administration of medication or other fluids to the subject, as is well known. Access devices can be designed for use with connecting apparatus employing standard luers, and such devices are commonly referred to as "luer access devices," "luer-activated devices," or "LADs." LADs can be modified with one or more features such as antiseptic indicating devices. Various LADs are illustrated in U.S. Pat. Nos. 5,242,432, 5,360,413, 5,730,418, 5,782,816, 6,039,302, 6,669,681, and 6,682,509, and U.S. Patent Application Publication Nos. 2003/0141477, 2003/0208165, 2008/0021381, and 2008/0021392, the disclosures of which are hereby incorporated by reference in their entireties.

I.V. sets can incorporate additional optional components including, for example, septa, stoppers, stopcocks, connectors, protective connector caps, connector closures, adaptors, clamps, extension sets, filters, and the like. Thus, additional suitable medical devices and medical device components which may be processed in accordance with the methods of the present disclosure include, but are not limited to: I.V. tubing, I.V. fluid bags, I.V. set access devices, septa, stopcocks, I.V. set connectors, I.V. set connector caps, I.V. set connector closures, I.V. set adaptors, clamps, I.V. filters, catheters, needles, stethoscopes, and cannulae. Representative access devices include, but are not limited to: luer access devices including, but not limited to, and needleless luer access devices.

The surface of the medical device or medical device component can be fully or partially coated with the metallic nanoparticle coating. The coating can be present on (or carried by) an exterior surface of the device (i.e., a surface which is intended to come into contact with a patient or healthcare provider), an interior surface of the device (i.e., a surface which is not intended to come into contact with a patient or healthcare provider, but which can come into contact with the patient's blood or other fluids), or both. Suitable medical devices and medical device components are illustrated in U.S. Pat. Nos. 4,412,834, 4,417,890, 4,440,207, 4,457,749, 4,485,064, 4,592,920, 4,603,152, 4,738,668, 5,630,804, 5,928,174, 5,948,385, 6,355,858, 6,592,814, 6,605,751, 6,780,332, 6,800,278, 6,849,214, 6,878,757, 6,897,349, 6,921,390, and 6,984,392, and U.S. Patent Application Publication No. 2007/0085036, the disclosures of which are hereby incorporated by reference in their entireties.

The coatings of the present disclosure can comprise metallic nanoparticles having antimicrobial properties. Suitable metals for use in the metallic nanoparticle coatings include, but are not limited to: silver, copper, gold, zinc, cerium, platinum, palladium, and tin. Metallic nanoparticle coatings comprising a combination of two or more of the foregoing metals can also be used.

The antimicrobial activity of metallic nanoparticle coatings can be affected by various physical properties of the nanoparticles, such as the average size of the particles, the size distribution of the particles, the arrangement of the particles on the surface, the composition of additional coating components, and other factors. Exposing substrate surfaces carrying a coating comprising metallic nanoparticles to a plasma treatment according to the methods disclosed herein can alter the physical properties of the nanoparticles, for example, the particle sizes, thereby providing metallic nanoparticle coatings having increased antimicrobial efficacy.

The initial diameter of the metallic nanoparticles typically is from about 1 nm to about 1000 nanometers, from about 1 nm to about 100 nanometers, from about 10 nm to about 70 nanometers, and/or from about 30 nm to about 50 nanometers. In this regard, it has generally been found that existing metallic coatings (which have not been treated in accordance with the inventive methods) typically include nanoparticles which have a narrow size distribution (monodisperse), i.e., such coatings comprise nanoparticles of substantially the same diameter. For example, a substantial portion of the nanoparticles in a given coating which has not been treated in accordance with the inventive methods have a diameter within ±10 nm of each other, for example, at least 50%, at least 60%, at least 70%, or more of the nanoparticles have a diameter typically within ±10 nm of each other, for example, at least 50% of the nanoparticles have a diameter between about 30 nm and about 50 nm.

A broad size distribution of metallic nanoparticles often is desirable to modify the rate of release of metal ions from the substrate surface, thereby providing more uniform, sustained release of the metal ions from the coated substrate surface. The methods according to the disclosure typically produce coatings comprising nanoparticles between about 0.1 nm and about 500 nm, between about 0.1 nm and about 100 nm, between about 0.5 nm and about 50 nm, and/or between about 2 nm and about 30 nm, but of course the obtained size range largely depends upon the initial diameter of the metallic nanoparticles. It has generally been found that metallic coating compositions which have been treated in accordance with the inventive methods typically include nanoparticles of varying sizes (i.e., demonstrating polydispersity). For example, typically less than 50% the nanoparticles in a coating which has been treated in accordance with the inventive methods have a diameter within ±10 nm of each other, for example, less than 60%, less than 70%, or more of the nanoparticles have a diameter within ±10 nm of each other, for example, less than 50% of the nanoparticles have a diameter between about 30 nm and about 50 nm. Coatings comprising nanoparticles demonstrating relatively increased polydispersity are advantageous in that the aforementioned size distribution allows the coatings to advantageously demonstrate a broader release profile over an extended period of time. Additionally, the smaller particles contained therein can allow the coatings to provide an initial burst of activity sooner than observed with coatings that have not been treated in accordance with the disclosure.

Plasma Methods

The term "plasma" as used herein, describes a partially or fully ionized gas composed of ions, electrons, and neutral species.

Plasmas for use in accordance with the present methods can be generated by various known methods, such as by the application of electric and/or magnetic fields. Various types of power sources can be used to generate suitable plasmas for use in the disclosed methods; typical power sources include direct current (DC), radiofrequency (RF), microwave, and laser power sources. A parallel-plate plasma source, for example, uses a RF power source to generate plasma through gas discharge. Another example of a RF power source is an inductive coupling plasma source which uses an inductively coupled RF source to generate plasma. The RF power source can operate at 13.56 MHz or at another frequency. Microwave power sources include, for example, the electron cyclotron resonance (ECR) source. The microwave frequency can be 2.45 GHz or another frequency.

In accordance with the present disclosure, plasmas can be generated at various pressures, and suitable plasma pressures can be readily determined by one of ordinary skill. Plasma can be generated, for example, at atmospheric pressure or under vacuum. Damage to the substrate or substrate coating can be more prevalent at higher pressures compared to lower pressures. Thus, the use of lower pressures can prevent or reduce damage to the substrate or substrate coating, thereby allowing increased exposure times and/or increased power levels to be used. Typical pressures at which plasma can be generated include pressures of about 0.001 Torr to about 760 Torr, for example, about 0.01 Torr to about 100 Torr, about 0.05 Torr to about 50 Torr, and/or about 0.1 Torr to about 10 Torr, but higher and lower pressures also can be used.

The substrate surfaces can be exposed to the plasma for various periods of time. The length of desired exposure can be readily determined by one of ordinary skill. Further, the length of exposure can vary depending on the reactivity of the plasma and/or the desired properties of the processed substrate surface. Damage to the substrate or substrate coating can be more prevalent after longer exposure times compared to shorter exposure times. Thus, the use of shorter exposure times can prevent or reduce damage to the substrate or substrate coating, thereby allowing increased pressure and/or increased power levels to be used. Typically, the substrate surface is exposed for about 1 second to about 2 hours, but shorter and longer exposure periods can be used. Generally, the substrate surface is exposed to the plasma for about 5 seconds to about 1 hour, about 10 seconds to about 30 minutes, about 30 seconds to about 20 minutes, and/or about 1 minute to about 10 minutes.

The substrate surfaces can be exposed to the plasma for a continuous period of time. The substrate surfaces also can be exposed to the plasma for intermittent (or "pulsed") periods of time, i.e., the process can comprise exposure of the substrate surface to the plasma for a period of time, followed by a period during which the substrate surface is not exposed to the plasma. Such periods of exposure and non-exposure can be repeated multiple times. Damage to the substrate or substrate coating can be more prevalent after continuous exposure processes compared to pulsed exposure processes. Thus, the use of pulsed exposure processes can prevent or reduce damage to the substrate or substrate coating, thereby allowing increased pressure and/or increased power levels to be used. Increased power levels over pulsed periods may advantageously reduce the amount of time in which the substrates are exposed to the plasma, thereby reducing part cycle time and increasing manufacturing efficiencies.

In accordance with the methods of the present disclosure, metal nanoparticle-coated surfaces can be exposed to plasma in a suitable process chamber. Exposing the coated surfaces in a process chamber includes positioning the substrate surface in a process chamber, introducing a process gas into the process chamber, and generating the plasma. Generally, about 0.05 watts to about 30,000 watts of power can be used to generate the plasma, but higher and lower powers also can be used. Typical power ranges can be from about 0.1 watts to about 10,000 watts, from 0.5 watts to about 5,000 watts, from about 1 watt to about 1,000 watts, from about 2 watts to about 500 watts, from about 5 watts to about 250 watts, and/or from about 10 watts to about 100 watts. The plasma can be generated in the process chamber from a suitable process gas. The process gas includes inert gases, such as helium, neon, argon, krypton, and xenon. Other suitable process gases include reactive gases, such as air, oxygen, hydrogen peroxide, nitrogen, hydrogen chloride, hydrogen bromide, fluorine, chlorine, bromine, iodine, halogenated hydrocarbons, and ammonia. Mixtures of gases, including mixtures of inert gases and reactive gases, also are contemplated for use in the inventive methods.

Thus, suitable plasmas include, but are not limited to: helium plasmas, neon plasmas, argon plasmas, krypton plasmas, xenon plasmas, air plasmas, oxygen plasmas, hydrogen peroxide plasmas, nitrogen plasmas, ammonia plasmas, and halogen plasmas. Exemplary halogen plasmas include hydrogen chloride plasmas, hydrogen bromide plasmas, fluorine plasmas, chlorine plasmas, bromine plasmas, iodine plasmas, and plasmas of halogenated hydrocarbons. Suitable plasmas also include mixtures of the foregoing plasmas. An exemplary plasma mixture is a plasma of hydrogen peroxide and air.

The disclosure may be better understood by reference to the following example which is not intended to be limiting, but rather only set forth exemplary embodiments in accordance with the disclosure.

EXAMPLE

Exposure of Silver-Coated Polycarbonate Surfaces to Plasma

Polycarbonate surfaces having coatings comprising metallic silver nanoparticles were analyzed by transmission electron microscopy (TEM) to determine the initial size range of the silver nanoparticles. First, the silver coating was removed from the polycarbonate surface by rinsing the surface with dichloromethane. The rinse suspension was then centrifuged to separate the silver nanoparticles from the soluble organic components. The supernate was discarded, and the pellet of particles was resuspended in dichloromethane. The suspension was then applied to a carbon film supported on a TEM grid, and the initial size range of the silver nanoparticles was determined by TEM to be about 30 nm to about 50 nm in diameter.

These polycarbonate surfaces having coatings comprising metallic silver nanoparticles of 30 nm to 50 nm in diameter were exposed to a plasma of oxygen. An oxygen plasma was generated at a pressure of 0.05 Torr using an RF power source at 125 watts of power. The sample was exposed to the plasma for a continuous (non-pulsed) period of 2 minutes. After exposure to plasma, the color of the initially brown polycarbonate surface was lighter, as assessed by visual inspection.

The transparency of the sample before and after exposure to the plasma was assessed by transmitted light photography. Transmitted light photographs of the samples were converted to digital grayscale images for analysis. To determine and the intensity of light ($I_0$) in the absence of the sample, a rectangular area of the image near the sample and representative of the background was selected. Typically, the rectangular area contained approximately 1000 pixels. A histogram displaying a graph of pixel intensity for the selected area was examined, and the mean pixel area was recorded as $I_0$. To determine and the intensity of light (I) that passed through the sample, a rectangular area of the same size and representative of the sample was selected. A histogram displaying a graph of pixel intensity for the selected area was examined, and the mean pixel area was recorded as I. The relative grayscale value of the sample was defined as: $-\log(I/I_0)$. Lower relative grayscale values, therefore, demonstrate that a higher fraction of light is transmitted through the substance.

Relative grayscale values for the sample before and after exposure to the plasma are provided in Table 1. These results demonstrate that exposure of the silver nanoparticle-coated surface to an oxygen plasma increased the transparency of the polycarbonate surfaces (Sample B, relative grayscale value=0.222) after processing in accordance with the disclosed methods, as compared to the transparency of an untreated coated control (Sample A, relative grayscale value=0.332).

TABLE 1

| Sample | Composition | Relative Grayscale Value | Normalized Ag Content |
|---|---|---|---|
| A | Untreated coated control | 0.332 | 1.00 |
| B | Oxygen plasma | 0.222 | 1.19 |

Energy dispersive x-ray (EDX) spectroscopy was performed to determine the silver content of the sample after plasma exposure. As shown in Table 1, the silver content of the unexposed control sample was similar to that of the sample exposed to oxygen plasma. Accordingly, these data demonstrate that the silver is not simply being ablated from the substrate surface, and are consistent with a physical change in the particles upon plasma treatment.

The size range of the silver nanoparticles after exposure to plasma was determined by TEM according to the methods described above. The particles were found to be smaller in size and more polydisperse after exposure than before plasma exposure, ranging in size from about 2 nm to about 30 nm. The diffraction data confirmed that exposure to plasma did not alter the nanoparticles chemically; instead the nanoparticles were primarily crystalline metallic silver resulting largely from physical fragmentation caused by the plasma exposure.

What is claimed is:

1. A method for processing a substrate comprising metallic nanoparticles comprising: providing a substrate surface comprising metallic nanoparticles, and exposing the substrate surface to a plasma, wherein the substrate surface comprises a surface of a medical device or medical device component, and wherein the plasma is selected from the group consisting of hydrogen chloride plasmas, hydrogen bromide plasmas, fluorine plasmas, chlorine plasmas, bromine plasmas, iodine plasmas, plasmas of halogenated hydrocarbons, and mixtures thereof.

2. The method of claim 1, wherein the substrate surface comprises at least one plastic, glass, metal, ceramic, elastomer, or mixtures or laminates thereof.

3. The method of claim 1, wherein the substrate surface comprises a plastic or elastomer selected from the group consisting of: acrylonitrile butadiene styrenes, polyacrylonitriles, polyamides, polycarbonates, polyesters, polyetheretherketones, polyetherimides, polyethylenes, polyethylene terephthalates, polylactic acids, polymethyl methyacrylates, polypropylenes, polystyrenes, polyurethanes, poly(vinyl chlorides), polyvinylidene chlorides, polyethers, polysulfones, silicones, natural rubbers, synthetic rubbers, styrene butadiene rubbers, ethylene propylene diene monomer rubbers, polychloroprene rubbers, acrylonitrile butadiene rubbers, chlorosuphonated polyethylene rubbers, polyisoprene rubbers, isobutylene-isoprene copolymeric rubbers, chlorinated isobutylene-isoprene copolymeric rubbers, brominated isobutylene-isoprene copolymeric rubbers, and mixtures and copolymers thereof.

4. The method of claim 1, wherein the substrate surface comprises a surface of a medical fluid container or medical fluid flow system.

5. The method of claim 1, wherein the substrate surface comprises a surface of an I.V. set.

6. The method of claim 1, wherein the substrate surface comprises a surface of a medical device or medical device component selected from the group consisting of: I.V. tubing, I.V. fluid bags, access devices for I.V. sets, septa, stopcocks, I.V. set connectors, I.V. set adaptors, clamps, I.V. filters, catheters, needles, and cannulae.

7. The method of claim 1, wherein the substrate surface comprises a surface of a luer access device or a needleless luer access device.

8. The method of claim 1, wherein the metallic nanoparticles comprise an antimicrobial metallic nanoparticle coating.

9. The method of claim 1, wherein the metallic nanoparticles comprise silver, copper, gold, zinc, cerium, platinum, palladium, tin, or mixtures thereof.

10. The method of claim 1, wherein the metallic nanoparticles comprise silver.

11. The method of claim 1, wherein the metallic nanoparticles have an initial diameter of about 1 nm to about 1000 nanometers.

12. The method of claim 1, wherein the plasma is generated at a pressure of about 0.001 Torr to about 760 Torr.

13. The method of claim 1, comprising exposing the substrate surface to the plasma for about 1 second to about 2 hours.

14. The method of claim 1, wherein the exposing comprises positioning the substrate surface in a process chamber, introducing a process gas into the process chamber, and generating the plasma.

15. The method of claim 14, wherein the plasma is generated using about 0.05 watts to about 30,000 watts of power.

16. The method of claim 14, wherein the plasma is generated using about 0.5 watts to about 5,000 watts of power.

17. The method of claim 1, wherein prior to the exposing step at least 50% of the nanoparticles have a diameter within ±10 nm of each other, and after the exposing step less than 50% the nanoparticles have a diameter within ±10 nm of each other.

\* \* \* \* \*